US 8,321,464 B2
Nov. 27, 2012

(12) United States Patent
Perry et al.

(54) PROJECT PROPERTY SHEETS

(75) Inventors: Kevin Perry, Burnaby (CA); Sreraman Narasimhan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/617,330

(22) Filed: Nov. 12, 2009

(65) Prior Publication Data

US 2010/0057814 A1    Mar. 4, 2010

Related U.S. Application Data

(62) Division of application No. 10/977,966, filed on Oct. 28, 2004, now Pat. No. 7,634,485.

(51) Int. Cl.
*G06F 17/30* (2006.01)

(52) U.S. Cl. ...................................... 707/793

(58) Field of Classification Search .......... None
See application file for complete search history.

(56) References Cited

U.S. PATENT DOCUMENTS

| 5,359,707 | A | 10/1994 | Sato |
| 5,634,098 | A | 5/1997 | Janniro et al. |
| 5,991,534 | A | 11/1999 | Hamilton et al. |
| 6,002,398 | A | 12/1999 | Wilson |
| 6,687,355 | B1 | 2/2004 | Porter |
| 6,754,885 | B1 * | 6/2004 | Dardinski et al. ............ 717/113 |
| 6,920,608 | B1 | 7/2005 | Davis |
| 6,993,513 | B2 | 1/2006 | Beams et al. |
| 7,254,570 | B2 * | 8/2007 | Stickler ............................... 1/1 |
| 7,634,485 | B2 | 12/2009 | Perry et al. |
| 2002/0161750 | A1 * | 10/2002 | Rajarajan et al. ................ 707/3 |
| 2003/0101287 | A1 * | 5/2003 | Novik et al. .................. 709/318 |
| 2004/0230575 | A1 | 11/2004 | Kramer et al. |
| 2004/0230888 | A1 | 11/2004 | Kramer et al. |
| 2005/0027582 | A1 | 2/2005 | Chereau et al. |
| 2005/0149545 | A1 * | 7/2005 | Zenz ............................ 707/101 |

FOREIGN PATENT DOCUMENTS

WO    WO 95/14969 A1    6/1995

* cited by examiner

*Primary Examiner* — Bai D. Vu
(74) *Attorney, Agent, or Firm* — Woodcock Washburn LLP (57) ABSTRACT

Project property sheets store project compiler and tool properties that are shared across multiple software projects. Property sheets enable a global repository of compiler and tool settings, so that changes in a global project property sheet will automatically propagate to the project property sheets that inherit from the global project property sheet, or from other project property sheets that inherit from the global project property sheet. Users of project property sheets are able to customize their project property sheet by defining their own compiler and tool properties. Defined compiler and tool properties override or supplement compiler and tool properties found in the global project property sheet.

11 Claims, 4 Drawing Sheets

PROJECT PROPERTY SHEETS

CROSS REFERENCE TO RELATED APPLICATION

This patent application is a divisional of and claims priority to U.S. patent application Ser. No. 10/977,966 filed Oct. 28, 2004, entitled PROJECT PROPERTY SHEETS, now U.S. Pat. No. 7,634,485, issued Dec. 15, 2009, which is incorporated herein by reference in its entirety.

FIELD OF THE INVENTION

Background of the Invention

This invention relates the field of software development. More specifically, the invention relates to specifying compiler and tool settings for use in the development of software applications.

Modern software applications typically are developed by several different groups, each group working on a particular aspect of the application. For example, there may a group focusing solely on the user interface of the application, and another focused on database programming. As a result, each group may desire its own compiler and tool settings. To facilitate this, groups often maintain their own project files where they specify their particular compiler and tool settings.

However, as software applications become larger, and groups are further divided into more specialized subgroups, it can become difficult to manage the large number of project files required. Specifically, if a group makes a change to a project file that should be changed in the project file of every group, such as an additional header file for the compiler, there is currently no reliable way to ensure that each group makes the necessary changes in their project files.

In addition, a project leader of the overall application may wish to make certain global changes, for example changing the location of the code libraries. Currently, the project leader would advise each of the groups to make the changes themselves. The project leader may also desire to make certain default project settings for each of the groups, or to enforce certain best practices project settings for the groups.

What is needed are systems and methods for project sheet inheritance that allows changes in a property sheet file to be automatically propagated to all the projects that inherit from the given property sheet.

SUMMARY OF THE INVENTION

Project property sheets allow separate project teams working on different aspects of the same application to individually set compiler and tool settings, while at the same time inherit compiler and tool settings from a global project property sheet. Groups can specify those tool and compiler settings that are specific to them, and automatically inherit changes or updates made to the global project property sheet.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Figure 1:
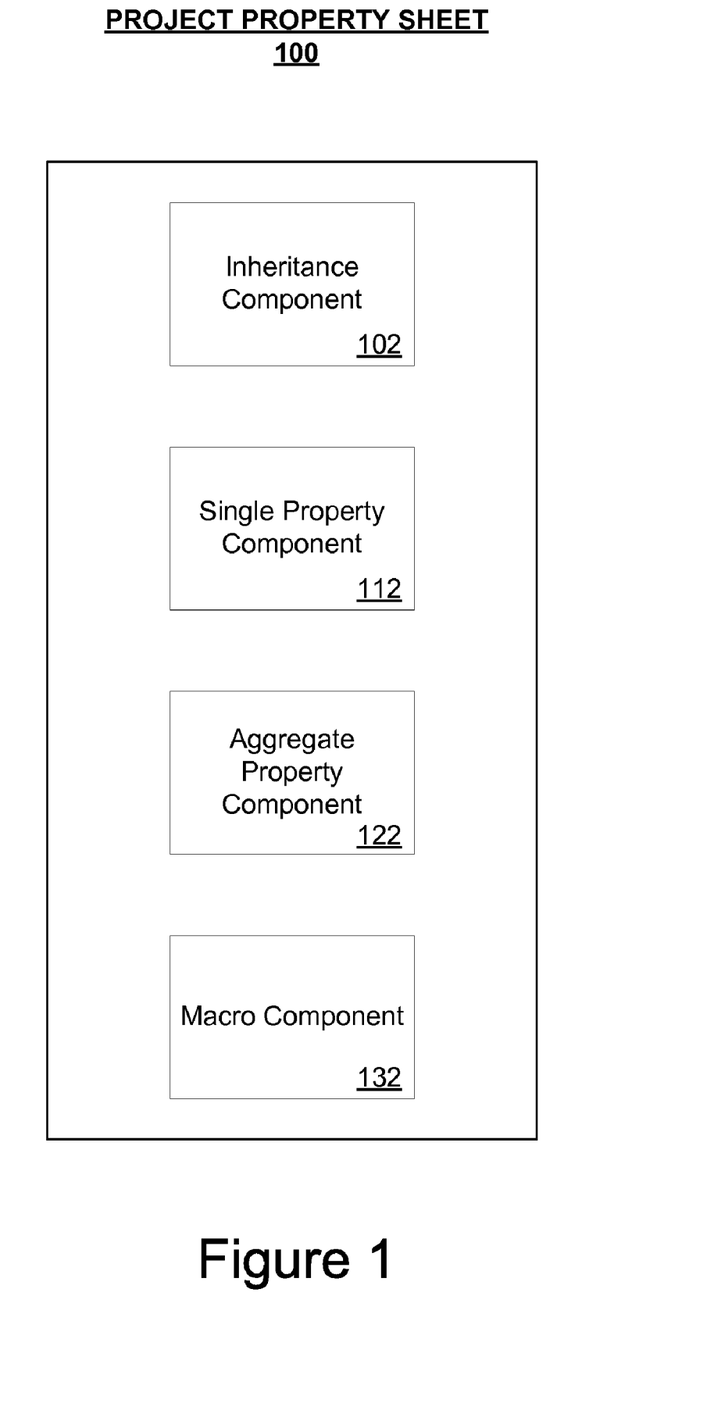
FIG. 1 is a block diagram illustrating exemplary components of a project property sheet in accordance with the present invention.

FIG. 1 is an illustration of an exemplary project property sheet 100. Project property sheet 100 comprises several components, including inheritance component 102, single property component 112, aggregate property component 122, and macro component 132.

Project property sheets are desirably used in the creation of a software application to define compiler and tool settings used when compiling and debugging source code associated with the application. As described above, applications are often created by multiple teams. For example, one team may be working on the user interface of the application, while another team may be working on the network functionality of the same application. Each team, while working on the same software application, may have its own particular needs when it comes time to compile and debug their portion of the application. Certain compiler settings may be useful for debugging the user interface of the application, but useless for debugging the network functionality, for example. Each team is desirably able to set and define their particular compiler and tool settings.

However, while it is desirable that each team be able to define their own compiler and tool settings, programming large software applications can become unruly when teams are working independent of one another, making it difficult to keep track of current developments and changes. If the user in charge of the overall software application wishes to make changes to certain files or libraries used in the compilation of the software application it can be difficult to make sure that each of the separate teams has made the necessary changes in their compiler and tool settings.

Project property sheets allow separate project teams to individually set compiler and tool settings, while at the same time provide for the inheritance of compiler and tool settings from other project property sheets. Groups and subgroups can customize and specify those tool and compiler settings that are specific to their needs, while inheriting tool and compiler settings from one or more project property sheets.

Inheritance component 102 desirably contains a reference to each of the project property sheets that the project property sheet 100 inherits from. Each project property sheet that the project property sheet 100 inherits from is desirably listed in the inheritance component 102 separated by a semi-colon or other punctuation, for example. There is no limitation as to the number of project property sheets that a given project property sheet 100 may inherit from. Each project property sheet is desirably listed using file path information specifying where the project property sheet can be found. The file path can be listed as relative to the project property sheet 100's location, or in absolute terms, for example.

The single property component 112 desirably includes all the compiler and tool setting that the developer wishes to define, and consequently overrides any definitions or instances of the same compiler or tool setting found in the inherited from project property sheets. Examples of single properties include, but are not limited to, compiler settings such as treat warnings as errors and enable buffer security checks. For example, a user or developer of a particular aspect or part of a software application may desire that certain compiler errors or warning messages be suppressed (e.g., not displayed) during the compiling process. The user or developer may desire that the errors or warnings be suppressed for a variety of reasons, particularly the errors or warnings may not be useful to debug the aspect of the application that the developer is working on, for example. However, a project leader of the overall application may have specified in a global project property sheet that all errors or warning be displayed.

To override this particular compiler setting, the user or developer, in the project property sheet 100, desirably defines the single property corresponding to compiler errors and warnings to suppress warnings and errors during the debugging process. As a result, when the project property sheet 100 is processed, the single property related to complier warnings and errors defined by the user will desirably override any instance of the same single property found in the inherited from project property sheets.

The aggregate property component 122 desirably includes all of the compiler or tool settings that the developer wishes to modify or add to, rather than override. Examples of aggregate properties include, but are not limited to, additional directories to search for include files, additional directories to search for library files, and preprocessor definitions.

For example, a user or developer may wish to modify the libraries that are used by the compiler to include a few new libraries. The user may not want to override or remove the libraries specified by the project manager in the global project property sheet, but rather desires to add the selected libraries to the list of libraries already included. As a result, when the project property sheet 100 is processed, any aggregate property defined in the project property sheet 100 do not override subsequent instances of the aggregate property sheet found in the inherited from property sheets, rather the properties are desirably appended together.

For example, a user may specify in the project property sheet 100 to include all files in a directory called "foo". In the global project property sheet, all files in the directory "bar" may be included. When the user processes the project property sheet 100, instead of overriding the included directories in the global project property sheet, the values are desirably appended together to include both the "bar" and the "foo" directories.

The macro component 132 comprises macros that are desirably used by developers to direct or control how single and aggregate properties are inherited. Macros desirably allow users to override or modify the inheritance of single and aggregate properties between project property sheets. Examples of macros include the no inherit macro, the stop evaluating macro and the inherit macro.

The inherit macro desirably allows users to specify where the parent's properties are inherited. With respect to aggregate properties, the default behavior is that each defined instance of the aggregate property is appended to previous instances of the same aggregate property. However, by inserting the inherit macro into the defined aggregate property in the project property sheet, a user can desirably change the order that subsequent aggregate properties are appended to the defined aggregate property. For example, a user may define an aggregate property called 'B'. If the user defines 'B' in the project property sheet with the inherit macro to the right of 'B' then, subsequent instances of 'B' in the parent project property sheets are desirably appended to the right of the current instance. In contrast, had the user added the inherit macro to the left of 'B', subsequent instances of 'B' in the parent project property sheets would desirably have been appended to the left of the current instance. Through the inherit macro users can desirably determine the order that compiler or tool settings are ultimately defined.

The no inherit macro desirably allows users to stop inheriting from the parent project property sheets for a given property. As described above, the default behavior for any given aggregate property in a project property is to inherit each instance of the same aggregate property from each parent of the project property sheet. The no inherit macro desirably allows a user to overcome this default behavior, by ignoring any instance of the same aggregate property defined in parent project property sheets if the no inherit macro is defined.

The stop evaluating macro desirably allows users to stop inheriting from not only parent project property sheets, but any other inherited from project property sheets. While the no inherit macro stops inheritance from parent project property sheets, it does not affect inheritance from project property sheets that are not parents of the project property sheet where the macro was encountered. The stop evaluating macro in contrast, once encountered for any given aggregate property desirably completely stops evaluation for that particular aggregate property. Any instances of the same aggregate property defined in parent project property sheets or non-parent project property sheets are desirably ignored.

Figure 2:
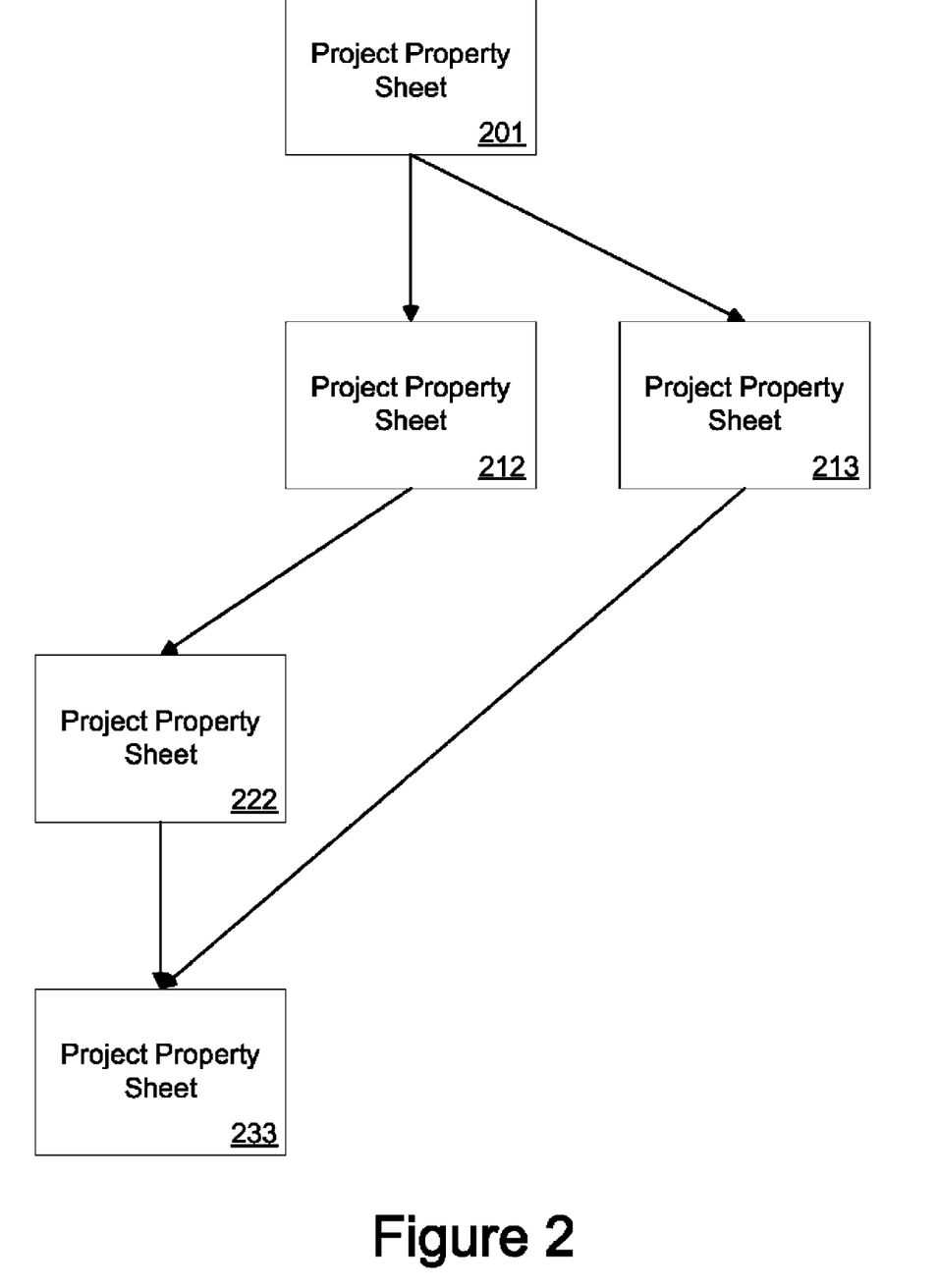
FIG. 2 is a block diagram illustrating an exemplary project property sheet inheritance hierarchy in accordance with the present invention.

FIG. 2 is a diagram of an exemplary project property sheet inheritance hierarchy in accordance with the present invention. As shown, there are five project property sheets. Project property sheet 233 inherits from project property sheets 222 and 213. Project property sheet 222 inherits from project property sheet 212. Project property sheet 212 inherits from project property sheet 201. Project property sheet 213 inherits from project property sheet 201. While there are only five project property sheets shown, it is for illustrative purposes only and not meant to limit the invention to only five project property sheets. Similarly, there is no limit to the number of project property sheets that a project property sheet may inherit from.

As shown, project property sheet 201 is the global project property sheet that all the other project property sheets inherit from. As described further with respect to FIG. 1, a project property sheet comprises single and aggregate properties that correspond to compiler and tool settings used to compile and debug a software application. The leader or manager of a software application development project desirably configures the single and aggregate properties of the global project property sheet to reflect certain "best practices" for software development, or general settings allowing each of the separate project teams to configure their own project property sheets with as few changes as possible.

Project property sheets 212 and 213 inherit from the global property sheet 201. Project property sheets 212 and 213 may be used by separate teams working on different aspects of the same software application. For example, the team using property sheet 212 may be working on the user interface of the application, while the team using property sheet 213 may be involved with the networking aspects of the invention. Because both teams inherit from the global project property sheet 201, any changes made to the global project property sheet are desirably immediately reflected in project property sheets 212 and 213.

Project property sheets desirably inherit from other project property sheets using a depth first method. The order that the project property sheets inheritance is evaluated can affect the single properties and aggregate properties that are defined. In addition, the evaluation of macros can also be affected by the order of inheritance.

For example, project property sheet 233 inherits from both property sheet 222 and project property sheet 213. Project property sheet 222 itself inherits from a chain of project property sheets starting with project property sheet 212 and ending with project property sheet 201. Project property sheet 213 itself inherits from project property sheet 201.

When project property sheet 233 is evaluated, each single property comprised in 233 is desirably defined. Following the depth first inheritance chain, property sheet 222 is desirably evaluated, and any single properties not defined in 233 are desirably defined. Next, property sheet 212 is desirably evaluated and any single properties not defined in 233 and 222 are desirably defined. Similarly, project property sheet 201 is desirably evaluated and any single property not defined in 233, 222 and 212 are desirably defined. Desirably after each property sheet in the inheritance chain following property sheet 222 has been evaluated, project property sheet 213 is desirably evaluated and only single properties comprised in 213 that were not defined in property sheets 233, 222, 212, and 201 are desirably defined. As shown in the example, any single properties defined in 213 lose priority to single properties defined in 233, 222, 212, and 201.

Similarly, for aggregate properties the order of inheritance effects the order in which the aggregate property values are appended together for any given aggregate property. As described previously with respect to FIG. 1, each instance of an aggregate property is appended to the previous instance of the same aggregate property. The string of values is then desirably used to define a particular compiler or tool setting. For example, assuming that a particular aggregate property is defined in each of the project property sheets shown in FIG. 2, after evaluating each of the project property sheets the resulting aggregate property would desirably comprise the value from 233, followed by the value from 222, followed by the value from 212, followed by the value from 201, followed by the value from 213.

The effect of macros in the project property sheets is also determined by the order of inheritance. As described with respect to FIG. 1, the no inherit macro desirably causes all inheritance from parent project property sheets for any given property to stop. For example, assume a user has inserted a no inherit macro into a property called 'B' in project property sheet 222. After evaluating property 'B' and the no inherit macro in project property sheet 222, evaluation of subsequent occurrences of 'B' in parent project property sheets desirably stops. Parent property sheets of 222 include 212 and 201. However, because the no inherit macro only affects inheritance from parent project property sheets, any occurrences of property 'B' in project property sheet 213 and 201 are desirably evaluated.

Figure 3:
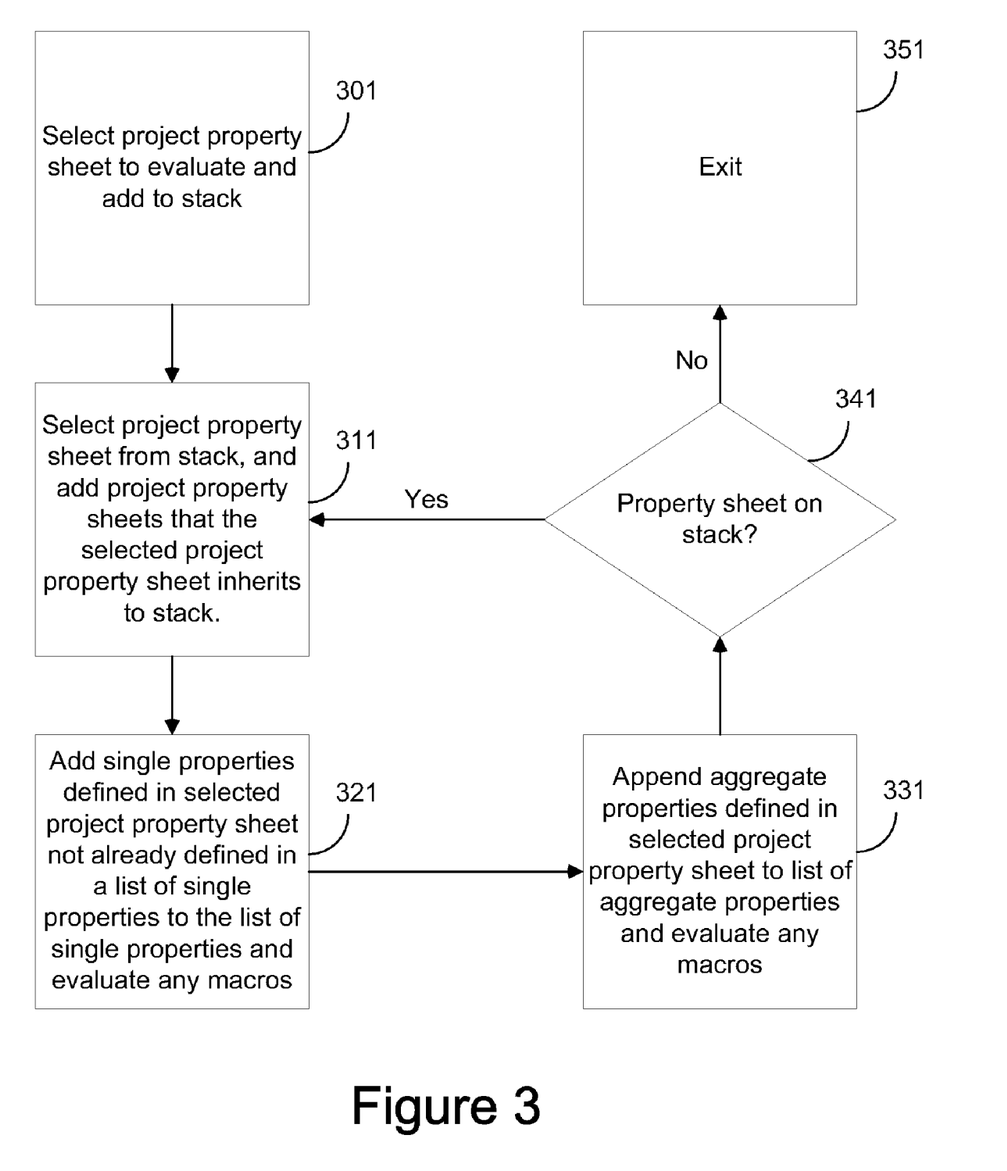
FIG. 3 is a flow diagram illustrating an exemplary method for evaluating a project property sheet in accordance with the present invention.

FIG. 3 is a flow chart illustrating an exemplary method for evaluating a project property sheet in accordance with the present invention. A project property sheet is desirably selected to be evaluated. Any single property defined in the property sheet is desirably added to a list of single properties. Any aggregate property defined in the project property sheet is desirably added to a list of aggregate properties. Any macros attached to the single or aggregate properties are desirably evaluated. Each project property sheet that the selected project property sheet inherits from is desirably added to a stack. Each project property sheet on the stack is then evaluated, one at a time, similarly to the selected project property sheet, except desirably only single properties not defined in the selected project property sheet are added to the list of single properties, and any aggregate properties already present in the list of aggregate properties are appended to the already defined aggregate properties. Any macros defined in the project property sheet are also desirably evaluated. Any project property sheets that are inherited from are desirably added to the top of the stack. Project property sheets are desirably evaluated until the stack is empty.

At 301, a project property sheet is selected to be evaluated. The project property sheet is desirably related to a software application, and comprises compiler and tool settings specific to the software application. In order to apply the correct tool and compiler settings, the selected project property sheet, and the project property sheets that it inherits from, are desirably evaluated to extract the single properties and aggregate properties defined therein. Defined single and aggregate properties desirably correspond to compiler and tool settings. Single and aggregate properties are discussed further with respect to FIG. 1. Once selected, the project property sheet is desirably added to a stack.

At 311, the project property sheet is desirably selected from the top of the stack to be evaluated. The stack is desirably a first in last out (FILO) type queue, wherein the most recently added project property sheet will be the next project property sheet to be evaluated. Using a stack provides the depth first type inheritance system as described further with respect to FIG. 2. Once the project property sheet is selected from the stack, each project property sheet that the selected project property sheet inherits from (if any) is desirably added to the stack.

At 321, any single properties defined in the selected project property sheet are desirably evaluated and added to a list of single properties. As described with respect to FIG. 1, any single properties defined in the selected project property sheet desirably override or take precedence over any defined single properties in the project property sheets that the selected project property sheet inherits from. Therefore, any single properties in the selected project property sheet that are already defined in the list of single properties are desirably ignored. Any single project properties not defined on the list are desirably added to the list.

Any macros defined in the single properties are desirably evaluated as the single properties of the current project property sheet are evaluated. If a no inherit macro is defined in the single property, then for the particular single property that contained the no inherit macro, subsequent instances of the single property in parent project property sheet are desirably ignored.

If a stop evaluating macro is defined in the single property, then for the particular single property that contained the stop evaluating macro, subsequent instances of the single property in any subsequent project property sheets are desirably ignored.

At 331, any aggregate properties defined in the selected project property sheet are desirably evaluated and added to a list of aggregate properties. As described with respect to FIG. 1, any aggregate properties defined in the selected project property sheet are desirably appended to defined aggregate properties in the project property sheets that the selected project property sheet inherits from.

However, if the aggregate property defined in the selected project property sheet contains macros, the macros are desirably first evaluated before the aggregate property is appended to the aggregate property in the list of aggregate properties. How the macros affect the evaluation of the selected project property sheet depends on the particular macro encountered. As described with respect to FIG. 1, the macros may comprise a inherit macro, a no inherit macro, and a stop evaluating macro.

Any macros defined in the aggregate properties are desirably evaluated as the aggregate properties of the current project property sheet are evaluated. If a no inherit macro is defined in the aggregate property, then for the particular aggregate property that contained the no inherit macro, subsequent instances of the aggregate property in parent project property sheet are desirably ignored.

If a stop evaluating macro is defined in the aggregate property, then for the particular aggregate property that contained the stop evaluating macro, subsequent instances of the aggregate property in any subsequent project property sheets are desirably ignored. The stop evaluating macro differs from the no inherit macro in that the no inherit macro desirably stops inheritance of the aggregate properties from parents of the current project property sheet, whereas the stop evaluating macro stops further inheritance of the aggregate property from all project property sheets.

If an inherit macro is defined in the aggregate property, depending on where in relation to the aggregate property the inherit macro is defined, the macro desirably changes the order in which subsequent instances of the aggregate property are appended together. For example, if the inherit macro is inserted to the left of the aggregate property, subsequent occurrences of the same aggregate property are desirably appended to the left of the aggregate property. Similarly, if the inherit macro is inserted on the right of the aggregate property, subsequent instances of the same aggregate are desirably appended to the right of the aggregate property.

At 341, the stack is desirably checked to determine if there are any more project property sheets remaining to be evaluated. If there are more project property sheets remaining on the stack, the embodiment desirably continues to 311 where the next project property sheet on the stack will be processed, else the embodiment exits at 351.

Exemplary Computing Environment

Figure 4:
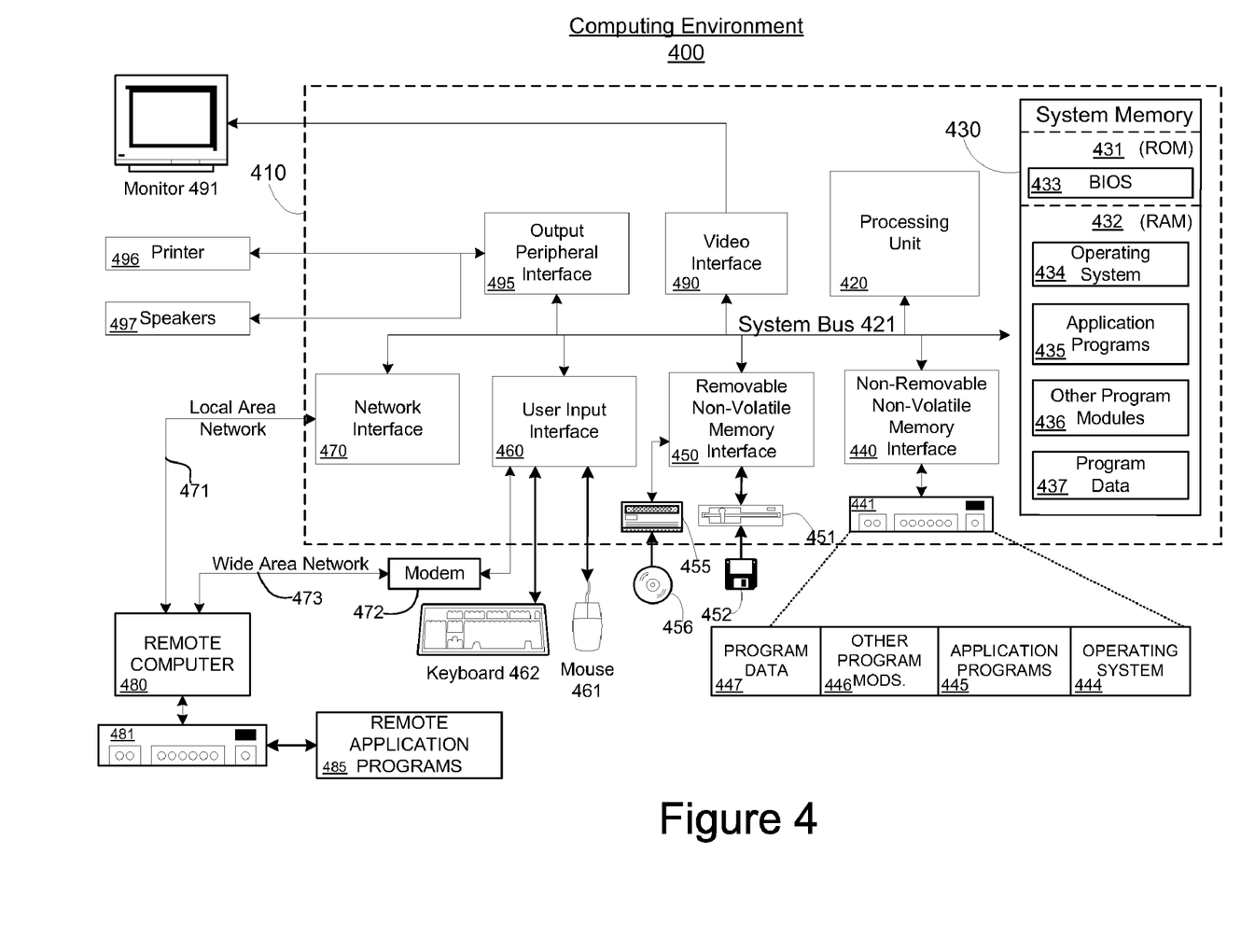
FIG. 4 is a block diagram showing an exemplary computing environment in which aspects of the invention may be implemented.

FIG. 4 illustrates an example of a suitable computing system environment 400 in which the invention may be implemented. The computing system environment 400 is only one example of a suitable computing environment and is not intended to suggest any limitation as to the scope of use or functionality of the invention. Neither should the computing environment 400 be interpreted as having any dependency or requirement relating to any one or combination of components illustrated in the exemplary operating environment 400.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 4, an exemplary system for implementing the invention includes a general purpose computing device in the form of a computer 410. Components of computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 410 typically includes a variety of computer readable media. Computer readable media can be any available media that can be accessed by computer 410 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 410. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 430 includes computer storage media in the form of volatile and/or non-volatile memory such as ROM 431 and RAM 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436, and program data 437.

The computer 410 may also include other removable/non-removable, volatile/non-volatile computer storage media. By way of example only, FIG. 4 illustrates a hard disk drive 440 that reads from or writes to non-removable, non-volatile magnetic media, a magnetic disk drive 451 that reads from or writes to a removable, non-volatile magnetic disk 452, and an optical disk drive 455 that reads from or writes to a removable, non-volatile optical disk 456, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media provide storage of computer readable instructions, data structures, program modules and other data for the computer 410. In FIG. 4, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies. A user may enter commands and information into the computer 410 through input devices such as a keyboard 462 and pointing device 461, commonly referred to as a mouse, trackball or touch pad. Other input devices (not shown) may include a microphone, joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. In addition to the monitor, computers may also include other peripheral output devices such as speakers 497 and printer 496, which may be connected through an output peripheral interface 495.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 4. The logical connections depicted include a LAN 471 and a WAN 473, but may also include other networks. Such networking environments are commonplace in offices, enterprise-wide computer networks, intranets and the internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example, and not limitation, FIG. 4 illustrates remote application programs 485 as residing on memory device 481. It will be appreciated that the network connections shown are exemplary and other means of establishing a communications link between the computers may be used.

As mentioned above, while exemplary embodiments of the present invention have been described in connection with various computing devices, the underlying concepts may be applied to any computing device or system.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed:

1. A computer-readable storage medium that is not a transient signal, the computer-readable storage medium having a first project property sheet data structure stored thereon, the first project property sheet data structure comprising:

an inheritance component that includes a reference to a second project property sheet data structure that comprises a plurality of properties that are inherited by the first project property sheet data structure;

a single properties component that includes a defined single property; and an aggregate properties component that includes a defined aggregate property that, when the plurality of properties includes a first property that is an instance of the defined aggregate property, appends the defined aggregate property to the first property inherited from the second project property sheet data structure.

2. The computer-readable storage medium of claim 1, the defined single property overriding a second property of the plurality of properties inherited from the second project property sheet data structure when the second property is an instance of the defined single property.

3. The computer-readable storage medium of claim 1, the second project property sheet data structure further including a second inheritance component that includes a reference to a third project property sheet data structure, the third project property sheet data structure comprising a second plurality of properties that are inherited by the second project property sheet data structure.

4. The computer-readable storage medium of claim 3, the second plurality of properties also inherited by the first project property sheet data structure.

5. The computer-readable storage medium of claim 1, further comprising a macro component that comprises at least one macro.

6. The computer-readable storage medium of claim 5, the macro comprising a no inherit macro that causes the first project property sheet data structure to ignore the first property.

7. The computer-readable storage medium of claim 5, the macro comprising an inherit macro that determines an order that the defined aggregate property is appended to the first property.

8. The computer-readable storage medium of claim 5, the macro comprising a stop evaluating macro that causes the first project property sheet data structure to ignore all instances of inherited properties that correspond to the defined aggregate property.

9. A system comprising:
a memory for storing project property sheets;
a global project property sheet comprising a plurality of aggregate properties and a plurality of single properties; and
a plurality of project property sheets, each of the plurality of project property sheets comprising a respective plurality of aggregate properties and a respective plurality of single properties; and
a processor configured to:
   determine an inheritance of aggregate properties and single properties between the global project property sheet and project property sheets of the plurality of project property sheets; and
   in accordance with the determined inheritance, append aggregate properties within a first project property sheet of the plurality of project property sheets to instances of same aggregate properties within a second project property sheet of the plurality of project property sheets,
   wherein the second project property sheet is designated to inherit from the first project property sheet.

10. The system of claim 9, wherein the processor is further configured to, in accordance with the determined inheritance, ignore inheritance of single properties from the first project property sheet for which respective instances of the single properties are present in the second project property sheet.

11. The system of claim 9, the single and aggregate properties corresponding to compiler and tool settings.

* * * * *